(12) United States Patent
Takanashi et al.

(10) Patent No.: US 8,389,650 B2
(45) Date of Patent: Mar. 5, 2013

(54) CURABLE POLYORGANOSILOXANE COMPOSITION

(75) Inventors: Masanori Takanashi, Tokyo (JP); Hideki Kobayashi, Tokyo (JP)

(73) Assignee: Momentive Performance Materials Japan LLC, Tokyo (JP)

( * ) Notice: Subject to any disclaimer, the term of this patent is extended or adjusted under 35 U.S.C. 154(b) by 0 days.

(21) Appl. No.: 13/240,397

(22) Filed: Sep. 22, 2011

(65) Prior Publication Data

US 2012/0029151 A1 Feb. 2, 2012

Related U.S. Application Data

(63) Continuation of application No. 12/311,710, filed as application No. PCT/JP2007/070404 on Oct. 19, 2007, now Pat. No. 8,129,480.

(30) Foreign Application Priority Data

Oct. 19, 2006 (JP) .................................. 2006-284830

(51) Int. Cl.
*C08L 83/04* (2006.01)

(52) U.S. Cl. ............ 525/478; 525/477; 528/15; 528/31; 528/32

(58) Field of Classification Search ........................ None
See application file for complete search history.

(56) References Cited

U.S. PATENT DOCUMENTS

| | | | |
|---|---|---|---|
| 5,446,087 | A | 8/1995 | Chizat et al. |
| 5,530,076 | A | 6/1996 | Eguchi et al. |
| 5,708,075 | A | 1/1998 | Chung et al. |
| 5,739,199 | A | 4/1998 | Eguchi et al. |
| 6,285,513 | B1 | 9/2001 | Tsuji et al. |
| 6,602,551 | B2 | 8/2003 | Kerboua et al. |
| 2004/0116640 | A1 | 6/2004 | Miyoshi |
| 2005/0227091 | A1 | 10/2005 | Suto et al. |

FOREIGN PATENT DOCUMENTS

| | | |
|---|---|---|
| EP | 0 672 724 A1 | 3/1995 |
| EP | 1 535 965 A1 | 6/2003 |
| JP | 63-268764 | 11/1988 |
| JP | 02-153969 | 6/1990 |
| JP | 03-000766 | 1/1991 |
| JP | 06-118254 | 4/1994 |
| JP | 07-252367 | 10/1995 |
| JP | 07-252419 A | 10/1995 |
| JP | 07-294701 A | 11/1995 |
| JP | 7-306301 | 5/1996 |
| JP | 2000-231002 | 8/2000 |
| JP | 2004-186168 | 7/2004 |
| JP | 2004-221308 | 8/2004 |
| JP | 2006-335857 | 12/2006 |
| WO | WO 03/104329 A1 | 12/2003 |

OTHER PUBLICATIONS

English-language International Preliminary Report on Patentability and Written Opinion of the International Searching Authority, dated Apr. 12, 2007 for International application PCT/JP2007/070404 filed Oct. 19, 2007, Applicants: Momentive Performance Materials Japan LLC.
International Search Report for PCT/JP2007/070404.

*Primary Examiner* — Marc Zimmer
(74) *Attorney, Agent, or Firm* — Holtz, Holtz, Goodman & Chick, P.C.

(57) ABSTRACT

A curable polyorganosiloxane composition for use in an LED or optical lens, including: (A) an alkenyl group-containing polyorganosiloxane which contains a (A1) branched polyorganosiloxane including an $SiO_{4/2}$ unit and an $R_3SiO_{1/2}$ unit, and optionally an $R_2SiO$ unit and/or an $RSiO_{3/2}$ unit, wherein at least three R per molecule are vinyl groups, and optionally (A2) a linear polyorganosiloxane having R bonded to a silicon atom, wherein at least two R per molecule are vinyl groups, wherein 100 mol % or more of the R present in components (A1) and (A2), excluding alkenyl groups, are methyl groups; (B) a polyalkylhydrogensiloxane including an $SiO_{4/2}$ unit and an $R^3(CH_3)_2SiO_{1/2}$ unit, the polyalkylhydrogensiloxane having the formula $[R^3(CH_3)_2SiO_{1/2}]_8[SiO_{4/2}]_4$ or $[R^3(CH_3)_2SiO_{1/2}]_{10}[SiO_{4/2}]_5$, wherein each $R^3$ represents a hydrogen atom, and (C) a platinum-vinylsiloxane complex. The composition having desirable light transmission properties, and is unlikely to suffer yellowing due to exposure to heat.

5 Claims, No Drawings

CURABLE POLYORGANOSILOXANE COMPOSITION

CROSS-REFERENCE TO RELATED APPLICATIONS

This application is a continuation application of application Ser. No. 12/311,710 filed Apr. 9, 2009 (U.S. Pat. No. 8,129,480), which is the United States national phase application under 35 USC 371 of International application PCT/JP2007/070404 filed Oct. 19, 2007. The entire contents of each of application Ser. No. 12/311,710 and International application PCT/JP2007/070404 are hereby incorporated by reference herein.

FIELD OF THE INVENTION

The present invention relates to a polyorganosiloxane composition which is curable by an addition reaction. More particularly, the present invention relates to a polyorganosiloxane composition which is cured to form a cured product advantageously used in optical applications such as a sealing material for light emitting diode (hereinafter, referred to as "LED") and a lens. In addition, the present invention also relates to a cured product obtained by curing the polyorganosiloxane composition, particularly a cured product advantageously used for optical lens or LED.

BACKGROUND ART

From silicone resins and silicone rubbers, including polymers exhibiting physical properties between those of the silicone resin and rubber, there can be obtained products which are advantageous not only in that they have a heat resistance, a low-temperature resistance, electrical insulation properties and others, but also in that they are transparent. Therefore, the silicone resins and silicone rubbers are used in various optical applications. Particularly, in the applications of sealing or protection of LED and lens, a polyorganosiloxane composition which is cured to form a transparent cured product having high hardness is useful.

Patent document 1 discloses that a resin-form cured product, which is obtained by crosslinking branched polyorganosiloxane having an alkenyl group bonded to a silicon atom, particularly the polysiloxane having a phenyl group for achieving high refractive index, with polyorganohydrogensiloxane, is used in protection, bonding, or wavelength changing or controlling of LED, and lens. However, there is a problem in that, when the phenyl group content of the polyorganosiloxane is high, the resultant resin-form cured product has poor light transmission properties in a short wavelength region, i.e., in the blue to ultraviolet region. Further, the cured product has a drawback in that it suffers yellowing when exposed to heat. In recent years, in the field of LED, the luminance is improved, and the heat release increases as the luminance is increased. Hence, this problem must be solved as soon as possible.

On the other hand, as, a technique approaching the same task, which is different from introducing a phenyl group into polyorganosiloxane, patent document 2 discloses a resin-form cured product obtained by crosslinking polyorganosiloxane with polyorganohydrogensiloxane, wherein the polyorganosiloxane has a hydroxyl group or alkoxy group bonded to a silicon atom and has monovalent hydrocarbon groups bonded to a silicon atom wherein 80% or more of the monovalent hydrocarbon groups, excluding alkenyl groups, are methyl groups. However, there is a problem in that hydrolysis or polycondensation proceeds in the resultant resin-form cured product due to the remaining hydroxyl group or alkoxy group to cause a change with the lapse of time in hardness and others, so that the cured product becomes brittle.

Patent document 1: Japanese Unexamined Patent Publication No. 2004-186168
Patent document 2: Japanese Unexamined Patent Publication No. 2004-221308

DISCLOSURE OF THE INVENTION

Problems to be Solved by the Invention

An object of the present invention is to provide a curable polyorganosiloxane composition which advantageously forms a cured product suitable for LED or optical lens wherein the cured product has excellent light transmission properties in a short wavelength region, i.e., in the blue to ultraviolet region and is unlikely to suffer yellowing due to exposure to heat. Another object of the present invention is to provide a cured product which has the above excellent properties and is advantageously used as a sealing material for LED or an optical lens.

Means to Solve the Problems

The present inventors have made extensive and intensive studies with a view toward solving the above problems. As a result, it has been found that, when a composition using branched, alkenyl group-containing polyorganosiloxane containing a large amount of methyl groups as a base polymer and branched polyorganohydrogensiloxane as a crosslinking agent is cured by an addition reaction, the above object can be achieved, and the present invention has been completed.

Specifically, the present invention is directed to a curable polyorganosiloxane composition comprising:

(A) alkenyl group-containing polyorganosiloxane which comprises (A1) branched polyorganosiloxane comprising an $SiO_{4/2}$, unit and an $R_3SiO_{1/2}$ unit, and optionally an $R_2SiO$ unit and/or an $RSiO_{3/2}$ unit (wherein each R independently represents an unsubstituted or substituted monovalent hydrocarbon group), wherein at least three R per molecule are alkenyl groups, and optionally (A2) linear polyorganosiloxane having R bonded to a silicon atom (wherein R is as defined above), wherein at least two R per molecule are alkenyl groups, wherein 90 mol % or more of the R present in components (A1) and (A2), excluding alkenyl groups, are methyl groups;

(B) polyalkylhydrogensiloxane comprising an $SiO_{4/2}$ unit and an $R^3(CH_3)_2SiO_{1/2}$ unit (wherein each $R^3$ independently represents a hydrogen atom or a methyl group), wherein at least three $R^3$ per molecule are hydrogen atoms; and (C) a platinum group metal compound.

Further, the present invention is directed to a transparent cured product obtained by curing the curable polyorganosiloxane composition, which is advantageously used as a sealing material for LED or an optical lens.

Effect of the Invention

The curable polyorganosiloxane composition of the present invention can provide a cured product advantageously used as a sealing material for LED or an optical lens, which has excellent light transmission properties in a short wavelength region, i.e., in the blue to ultraviolet region and is unlikely to suffer yellowing due to exposure to heat.

BEST MODE FOR CARRYING OUT THE INVENTION

The curable polyorganosiloxane composition of the present invention comprises (A) a base polymer, (B) a crosslinking agent, and (C) a curing catalyst, and is cured by an addition reaction (hydrosilylation reaction) between an alkenyl group in component (A) and a silicon-hydrogen bond in component (B) to form a cured product.

In the composition of the present invention, as component (A), (A1) branched polyorganosiloxane and optionally (A2) linear polyorganosiloxane are used.

By using component (A1) as component (A), excellent mechanical strength can be imparted to the cured composition. Component (A1) is branched polyorganosiloxane comprising an $SiO_{4/2}$ unit and an $R_3SiO_{1/2}$ unit, and optionally an $R_2SiO$ unit and/or an $RSiO_{3/2}$ unit (wherein each R independently represents an unsubstituted or substituted monovalent hydrocarbon group), wherein at least three R per molecule are alkenyl groups on that the polyorganosiloxane particularly serves as a crosslinking point in the curing reaction. For obtaining the cured composition having excellent mechanical strength, the branched polyorganosiloxane is preferably in a resin form in the solid state or viscous semisolid state or in a liquid form at room temperature and has an molar ratio of $R_3SiO_{1/2}$ unit:$SiO_{4/2}$ unit in the range of from 1:0.8 to 1:3.

Examples of the R as alkenyl groups include vinyl, allyl, 3-butenyl and 5-hexenyl. The most preferred is a vinyl group from the viewpoint of easy to synthesis, and maintaining excellent flowability of the uncured composition and excellent heat resistance of the cured composition.

The alkenyl group can be present in the $R_3SiO_{1/2}$ unit as R. The alkenyl group is optionally present in the $R_2SiO$ unit or $RSiO_{3/2}$ unit as R. For achieving rapid curing at room temperature, it is preferred that at least part of the alkenyl group is present in the $R_3SiO_{1/2}$ unit.

Examples of the R, excluding alkenyl groups, include unsubstituted or substituted monovalent hydrocarbon groups containing no aliphatic unsaturated carbon-carbon bond, for example, alkyl groups such as methyl, ethyl, propyl, butyl, pentyl, hexyl, octyl, decyl and dodecyl; cycloalkyl groups such as cyclohexyl; aryl groups such as phenyl; aralkyl groups such as 2-phenylethyl and 2-phenylpropyl; and halogen- or cyano-substituted monovalent hydrocarbon groups such as chloromethyl, chlorophenyl, 2-cyanoethyl and 3,3,3-trifluoropropyl. From the viewpoint of obtaining excellent heat resistance, preferred is a methyl group.

In the present invention, component (A1) containing substantially no hydroxyl group or alkoxy group bonded to a silicon atom, which is derived from the raw materials and others, may be obtained by conducting the co-hydrolysis and polycondensation conducted by a general preparation method, followed by treating the resultant product using an aqueous solution of an alkaline substance (for example, sodium hydroxide or potassium hydroxide) and then neutralizing the product by a general method, or followed by removing moisture and then treating it with hexamethyldisilazane or 1,3-divinyl-1,1,3,3-tetramethyldisilazane.

In the present invention, it is preferred that component (A2) is used, together with component (A1), as a base polymer for the composition of the present invention. Component (A2) is linear polyorganosiloxane having R independently bonded to a silicon atom (wherein R is as defined above), wherein at least two R per molecule are alkenyl groups. Component (A2) may be substantially linear, and may contain a branched chain in a slight amount.

Component (A2) containing substantially no hydroxyl group or alkoxy group bonded to a silicon atom may be obtained by introducing as an end group an $R_3SiO_{1/2}$ group (for example, a dimethylvinylsiloxy group or a trimethylsilyl group), or by an alkaline treatment or a silylation treatment in a similar manner for component (A1).

Examples and preferred examples of R for component (A2) are the same as those for component (A1). R as an alkenyl group may be present at the end of the molecular chain of component (A2) or in the molecular chain, or present in the both. For obtaining the cured composition having excellent mechanical properties, it is preferred that R is present at least at the both ends of the molecular chain.

With respect to the viscosity of component (A2), for achieving the composition in the uncured state having excellent flowability and excellent workability and the cured composition having excellent mechanical strength and appropriate elasticity and hardness, the viscosity at 23° C. is preferably 0.01 to 1,000 Pa·s, more preferably 0.1 to 100 Pa·s.

Representative example of component (A2) is linear polyorganosiloxane having in its molecule at least two alkenyl group-containing siloxane units each represented by the following general formula (II):

$$(R^1)_a(R^2)_bSiO_{(4-a-b)/2} \qquad (II)$$

wherein:
$R^1$ represents an alkenyl group;
$R^2$ represents an unsubstituted or substituted monovalent hydrocarbon group containing no aliphatic unsaturated carbon-carbon bond;
a is 1 or 2, preferably 1; and
b is an integer of 0 to 2, with the proviso that a+b is 2 or 3.

Examples and preferred examples of $R^1$ are the same as those of the above R as an alkenyl group for component (A1), and examples and preferred examples of $R^2$ are the same as those of the above R for component (A), excluding alkenyl groups.

In the composition of the present invention, component (A1) and optionally component (A2) are used as component (A). With respect to component (A), 90 mol % or more, preferably 95 mol % or more, more preferably 100 mol % of the R present in component (A), excluding alkenyl groups, are methyl groups. When the number of methyl groups falls in this range, the cured product obtained from the composition can be improved in light transmission properties in a short wavelength region, i.e., in the blue to ultraviolet region, and is unlikely to suffer yellowing due to exposure to heat.

Advantageously 90 mol % or more, preferably 95 mol % or more, more preferably 100 mol % of the R present in component (A 1), excluding alkenyl groups, are methyl groups. When using component (A2), 90 mol % or more, preferably 95 mol % or more, more preferably 100 mol % of the R present in component (A2), excluding alkenyl groups, are methyl groups.

With respect to the amounts of components (A 1) and (A2) in component (A), it is preferred that the amount of component (A 1) is 50 to 100% by weight and the amount of component (A2) is 50 to 0% by weight, relative to 100% by weight of component (A). When the amounts of the individual components are in these ranges, component (A) is compatible with component (B) and hence a homogenous composition can be formed, and further excellent mechanical properties, particularly hardness needed for the cured product for LED or lens and low coefficient of linear expansion can be imparted to a cured product. It is more preferred that the amount of component (A1) is 60 to 100% by weight and the amount of component (A2) is 0 to 40% by weight.

Component (B) is polyorganohydrogensiloxane having an Si—H bond in its molecule, and serves as a crosslinking agent which undergoes a hydrosilylation reaction between the Si—H bond and an alkenyl group in base polymer (A) to form a cured product. As component (B), branched polymethylhydrogensiloxane comprising an $SiO_{4/2}$ unit and an $R^3(CH_3)_2SiO_{1/2}$ unit (wherein $R^3$ is as defined above) is selected since it is compatible with component (A) and hence a homogenous composition can be formed, and further high crosslinking density can be imparted to a cured product and therefore high hardness is imparted to a cured product. From the viewpoint of achieving the above point while maintaining workable and appropriate viscosity, with respect to the ratio of the $R^3(CH_3)_2SiO_{1/2}$ unit to the $SiO_{4/2}$ unit, the $R^3(CH_3)_2SiO_{1/2}$ unit) is preferably 1.5 to 2.2 mol, further preferably 1.8 to 2.1 mol, relative to 1 mol of the $SiO_2$ unit. For obtaining component (B) containing in its molecule substantially no hydroxyl group or alkoxy group bonded to a silicon atom, which is derived from the raw materials and others, the $R^3(CH_3)_2SiO_{1/2}$ unit is preferably 1.9 to 2.2 mol, more preferably 2.0 to 2.1 mol. Typically, especially preferred is $[R^3(CH_3)_2SiO_{1/2}]_8[SiO_{4/2}]_4$ or $[R^3(CH_3)_2SiO_{1/2}]_{10}[SiO_{4/2}]_5$ such that four to five Q units form a cyclic or chain siloxane skeleton wherein two (In case of the chain siloxane skeleton, three at the end Q unit) $M^H$ units and/or M units are bonded to each Q unit (with the proviso that one molecule has at least three $M^H$ units).

The number of the hydrogen atoms directly bonded to a silicon atom in $R^3$ of component (B) is three or more per molecule in average with respect to the whole of component (B). When the number is less than three in average, a satisfactory crosslinking density for obtaining a cured product having hardness required cannot be obtained. The rest of $R^3$ are methyl groups for facilitating the synthesis and achieving good balance between the advantageous features of siloxane including heat resistance.

Component (B) is contained in an amount that the ratio of the number of the hydrogen atoms bonded to a silicon atom to one alkenyl group present in component (A) (H/Vi) is 0.5 to 2.0, preferably 0.7 to 1.8. When H/Vi is less than 0.5, a cured product having satisfactory physical properties cannot be obtained. On the other hand, when H/Vi is more than 2.0, a large amount of Si—H bonds remain in the cured product and cause a polycondensation reaction due to heating, so that the resultant cured product is brittle and cracks are easily formed in the cured product during the heat history, and the cured product is very likely to suffer yellowing and is reduced in heat resistance and thermal shock resistance.

Platinum catalyst (C) used in the present invention is a catalyst for enhancing an addition reaction between an alkenyl group in component (A) and a hydrosilyl group in component (B). As a platinum group metal compound, there is used a compound of a platinum group metal atom such as platinum, rhodium or palladium, and examples include platinum compounds such as platinate chloride, a reaction product of platinate chloride and an alcohol, a platinum-olefin complex, a platinum-vinylsiloxane complex, a platinum-ketone complex and a platinum-phosphine complex; rhodium compounds such as a rhodium-phosphine complex and a rhodium-sulfide complex; and palladium compounds such as a palladium-phosphine complex. Of these, from the viewpoint of achieving excellent dissolution in component (A) and excellent catalytic activity, preferred is a platinum-vinylsiloxane complex.

For obtaining excellent curing rate, component (C) is contained generally in an amount of 0.1 to 1,000 ppm by weight, preferably 0.5 to 200 ppm by weight, in terms of a platinum group metal atom, relative to the weight of component (A).

In the composition of the present invention, for imparting appropriate flowability to the uncured composition and imparting to the cured product high mechanical strength required according to the application, powdered inorganic filler can be added in such an amount that excellent features of the cured product including transparency are not sacrificed. Examples of inorganic filler include dry powdered silica such as fumed silica and are silica, and preferred is fumed silica. For improving the transparency, it is preferred that the silica used as filler has a surface treated with a silazane compound such as hexamethyldisilazane or 1,3-divinyl-1,1,3,3-tetramethyldisilazane; or polyorganosiloxane such as octamethylcyclotetrasiloxane. With respect to the amount of the filler added, there is no particular limitation as long as the effect of the composition of the present invention can be obtained.

In the composition of the present invention, if necessary, an additive, for example, a curing retarder such as an acetylene compound (e.g., 3-methyl-1-butyn-3-ol, 3-methyl-1-pentyn-3-ol, 3,5-dimethyl-1-hexyn-3-ol or 1-ethynyl-1-cyclohexanol) or a vinyl group-containing cyclic siloxane having a vinyl group bonded to a silicon atom (e.g., 1,3,5,7-tetravinyl-1,3,5,7-tetramethylcyclotetrasiloxane); or a colorless heat-resistance improving agent such as a cerium compound (e.g., cerium octanoate), may be incorporated in an amount that the effect aimed at by the present invention including high hardness and transparency of the cured product is not sacrificed. According to the use, the composition of the present invention may be dissolved or dispersed in an organic solvent such as toluene or xylene.

The composition of the present invention can be prepared by uniformly kneading components (A) to (C) and an optional component by a mixing means such as a universal kneader or a kneader. With respect to component (A1) which is in the solid state or has extremely high viscosity, for improving the handling properties, component (A) can be formed by conducting the co-hydrolysis in an organic solvent such as toluene or xylene, and performing the subsequent steps in the form of an organic solvent solution, and optionally mixing component (A2), and then distilling off the solvent by heating under a reduced pressure. For stably storing the components for a long term, components (B) and (C) are individually stored in separate containers. For example, a main material portion comprising part of component (A) and component (C) and a curing agent portion comprising the rest of component (A) and component (B) are individually stored in separate containers, and they can be mixed together immediately before being used and deaerated under a reduced pressure.

A cured product may be obtained by combining the polyorganosiloxane composition of the present invention together with an object such as an LED, by injecting, dropping, flowcasting, casting or extruding from a container the composition to a site to be used, or by monolithic molding such as transfer molding or injection molding, and curing the composition by allowing it to stand at room temperature or heating.

The cured product obtained by curing the composition of the present invention has excellent light transmission properties in a short wavelength region, i.e., in the blue to ultraviolet region such that a cured product having a thickness of 2 mm generally has a light transmittance at a wavelength of 400 nm of 80% or more, more preferably 85% or more. The cured product generally has a light transmittance at a wavelength of 350 nm of 75% or more, preferably 80% or more. Further, the cured product is unlikely to suffer yellowing due to exposure to heat, and hence is unlikely to be lowered in transmittance.

The cured product obtained by curing the composition of the present invention generally has a refractive index of 1.40 to 1.43, preferably 1.41 to 1.42.

With respect to the cured product obtained by curing the composition of the present invention, the ratio of a Young's modulus measured by an autograph at 150° C. to a Young's modulus measured at 23° C. is generally ⅓ or more, and thus the cured product can be prevented from changing in hardness due to exposure to heat.

The cured product obtained by curing the composition of the present invention generally has a hardness of 60 or more, as measured by a type A durometer in accordance with JIS K6253. The cured product generally has a hardness of 20 or more, further preferably 40 or more, as measured by a type D durometer. Therefore, the cured product has excellent mechanical strength such that the surface of the cured product is unlikely to suffer damages, and further contaminants and others are unlikely to adhere to the surface.

The curable composition of the present invention can be used in sealing for LED. For example, the curable composition is introduced to a substrate having an LED mounted thereon by a casting method or the like so that the composition seals the LED and no air bubbles remain in the composition, and the composition is cured to prepare a shaped article of lens containing an LED therein. Alternatively, a lens shaped by a certain method is set in a part for LED, and an LED can be put in or fixed to it with an adhesive. Thus, the cured product obtained from the curable composition of the present invention is preferably used as a sealing material for LED or an optical lens.

EXAMPLES

Hereinbelow, the present invention will be described in more detail with reference to the following Examples and Comparative Examples. In the following Examples and Comparative Examples, "part(s)" is given by weight, "%" for formulation is given by weight, and the viscosity means a viscosity as measured at 23° C. The following Examples should not be construed as limiting the scope of the present invention.

In the following Examples and Comparative Examples, siloxane units are designated by the following symbols.

M unit: $(CH_3)_3SiO_{1/2}$-
$M^H$ unit: $(CH_3)_2HSiO_{1/2}$-
$M^V$ unit: $(CH_3)_2(CH_2=CH)SiO_{1/2}$-
D unit: —$(CH_3)_2SiO$—
$D^H$ unit: —$(CH_3)HSiO$—
$D^V$ unit: —$(CH_3)(CH_2=CH)SiO$—
$D^f$ unit: —$(C_6H_5)_2SiO$—
$T^f$ unit: $C_6H_5SiO_{3/2}$ (trifunctional)
Q unit: $SiO_{4/2}$ (tetrafunctional)

The polyorganosiloxanes used in the Examples and Comparative Examples are as follows.

a1-1: A 60% xylene solution of solid branched polymethylvinylsiloxane comprising an M unit, an $M^V$ unit and a Q unit and having a unit molar ratio represented by $M_5M^V Q_8$;

a1-2: Phenyl group-containing polyorganosiloxane comprising a D unit, a $D^V$ unit, a $D^f$ unit and a $T^f$ unit, having a unit molar ratio represented by $DD^V{}_{12}D^f{}_{54}T^f{}_{33}$, and having a viscosity of 5,000 Pa·s;

a2-1: Linear polymethylvinylsiloxane comprising $M^V$ units at the both ends, $D^V$ units in an amount of 10 mol % of the intermediate units, and D units in the rest of them, and having a viscosity of 200 mm$^2$/s at 23° C.; and a2-2: Linear polymethylvinylphenylsiloxane comprising $M^V$ units at the both ends, $D^V$ units in an amount of 30%, $D^f$ units in an amount of 30% of the intermediate units, and D units in the rest of them, and having a viscosity of 4,000 mm$^2$/s at 23° C.

The above polyorganosiloxane a1-1 was prepared as follows. 210 Parts of xylene, 271.3 parts of trimethylchlorosilane, 60.3 parts of dimethylvinylchlorosilane and 832 parts of tetraethoxysilane were placed in a reaction vessel having a stirrer, a dripping apparatus, a heating and cooling apparatus, and a vacuum evaporator, and the solids were completely dissolved. Excess water was dripped into the resultant solution to effect co-hydrolysis and condensation at 80° C. while removing heat of dissolution of the by-produced hydrochloric acid by cooling. The resultant organic layer was washed with water until the washing water became neutral, and dried and then KOH was added so that the concentration became 200 ppm to effect dehydration or condensation at 140° C. while removing water from the system. Then, the resultant reaction mixture was neutralized with phosphoric acid, and the salts formed were removed by filtration, and the resultant filtrate was diluted with xylene so that the non-volatile content became 60%.

The above polyorganosiloxane a2-1 was prepared as follows. 765.2 Parts of octamethylcyclotetrasiloxane and 98.8 parts of tetravinyltetramethylcyclotetrasiloxane were placed in a reaction vessel having a stirrer, a dripping apparatus, a heating and cooling apparatus, and a vacuum evaporator, and stirred at 140° C. while introducing $N_2$ into the reaction vessel to effect dehydration. Then, 14.2 parts of 1,7-divinyl-1,1,3,3,5,5,7,7-octamethylsiloxane and 8 parts of KOH were added to the resultant mixture to effect ring-opening polymerization at 140° C. for 8 hours. Subsequently, the resultant reaction mixture was cooled to 100° C., and 100 g of ethylene chlorohydrin was added thereto to effect neutralization at 100° C. for 2 hours. Then, low molecular-weight polymers were removed by stripping at 160° C. under 1.3 KPa (10 mmHg) or lower for 4 hours, followed by cooling and filtration, to obtain a desired product.

Crosslinking agent b used in the Examples and Comparative Examples was prepared as follows. 520 Parts of toluene, 879 parts of tetraethoxysilane, and 832 parts of dimethylchlorosilane were charged, and the solids were completely dissolved. The resultant solution was dripped into excess water in a reaction vessel having a stirrer, a dripping apparatus, a heating and cooling apparatus, and a vacuum evaporator while stirring to effect co-hydrolysis and condensation at room temperature while removing heat of dissolution of the by-produced hydrochloric acid by cooling. The resultant organic phase was washed with water until the washing water became neutral, and dried and then toluene and by-produced tetramethyldisiloxane were distilled off at 100° C. under 667 Pa (5 mmHg) to prepare polymethylhydrogensiloxane in the liquid state. The siloxane prepared has an average molecular weight of 800 (theoretical value: 776) as measured by GPC, and this molecular weight measurement and the result of an analysis of Si—H bond by alkalimetry have confirmed that the siloxane obtained is polymethylhydrogensiloxane approximately represented by $M^H{}_8Q_4$.

Curing catalyst c used in the Examples and Comparative Examples is a platinum-vinylsiloxane complex having a platinum content of 2% by weight, which is prepared by heating platinate chloride together with cyclic siloxane represented by $D^V{}_4$.

The curing retarder used in the Examples and Comparative Examples is 1-ethynyl-1-cyclohexanol. The fumed silica has a specific surface area of 300 m$^2$/g, and has a surface treated with hexamethyldisilazane.

Examples 1 to 3 and Comparative Example 1

In Examples, a1-1 is a xylene solution and hence, a1-1 and a2-1 were placed in a vessel having a vacuum heating apparatus and a stirrer, and stirred and mixed together until they became homogenious, and then xylene contained in a1-1 was distilled off at 140° C. under 667 Pa (5 mmHg) to prepare a base polymer mixture in the liquid state.

A main material portion comprising part of a base polymer, a catalyst and part of fumed silica, and a curing agent portion comprising the rest of the base polymer, a crosslinking agent, a curing retarder and the rest of the fumed silica were individually prepared using a universal kneader in the formulations shown in Table 1. The amounts of the base polymer and fumed silica were adjusted so that the weight ratio of main material portion:curing agent portion became almost 1:1. The main material portion and the curing agent portion were mixed together and deaerated, and casted into a sheet form having a thickness of 2 mm. The resultant sheet was cured by heating in an oven at 150° C. for one hour, thus obtaining a colorless and transparent resin-form cured product having slight elongation.

A composition and a cured product obtained therefrom were evaluated as follows.

(1) Hardness: The sheet was allowed to stand at 23° C. for 24 hours and then, with respect to the resultant sheet, a hardness was measured individually by a type A durometer and a type D durometer in accordance with JIS K6253.

(2) Light transmittance: With respect to the sheet (thickness: 2 mm), a light transmittance was measured at 23° C. individually at wavelengths of 400 nm and 350 nm using Spectrophotometer (model U-3410, manufactured by Hitachi, Ltd). Then, the sheet was allowed to stand at 180° C. for 1,000 hours and then, with respect to the resultant sheet, a light transmittance was similarly measured individually at wavelengths of 400 nm and 350 nm.

(3) Refractive index: With respect to the uncured composition, a refractive index was measured at 23° C. by means of Abbe refractometer (manufactured by ATAGO CO., LTD).

(4) Young's modulus: With respect to the specimen prepared from a sheet having a thickness of 2 mm using a dumbbell No. 2 shaped die described in JIS K6251, a tensile test was conducted using Autograph (model AG-IS, manufactured by Shimadzu Corporation) and a thermostatic chamber therefor, and a tensile strength at 2.5% elongation was determined as a Young's modulus.

The formulations in the Examples and Comparative Examples, curing properties of the compositions, and physical properties of the cured products are shown in Table 1. In the formulations, the amount of a1-1 is in terms of siloxane. With respect to the composition prepared by a method in which a main material portion and a curing agent portion are separately prepared and then mixed together, the amounts in the formulation shown in Table 1 are the individual total amounts.

TABLE 1

| Formulation | Part(s) by weight | Example 1 | Example 2 | Example 3 | Comparative Example 1 |
|---|---|---|---|---|---|
| Base polymer | a1-1 | 38.4 | 35.4 | 35.4 | |
| | a1-2 | | | | 58.0 |
| | a2-1 | 27.4 | 32.4 | 27.4 | |
| | a2-2 | | | | 26.0 |
| Crosslinking agent | b | 8.5 | 8.5 | 8.5 | 14.0 |
| Curing catalyst | c | 0.02 | 0.02 | 0.02 | 0.02 |
| Other components | Curing retarder: | 0.1 | 0.1 | 0.1 | 0.1 |
| | Fumed silica | | | 6.5 | |
| Methyl content mol % (relative to the hydrocarbon groups excluding vinyl group) | | 100 | 100 | 100 | 27.9 |
| H/Vi* | | 1.03 | 0.97 | 1.07 | 1.22 |
| Refractive index | | 1.41 | 1.42 | 1.42 | 1.53 |
| Hardness | JIS A | 97 | 96 | 98 | 99 |
| | JIS D | 52 | 45 | 60 | 70 |
| Transmittance | Initial 400 nm [%] | 90 | 91 | 89 | 89 |
| | 350 nm [%] | 88 | 90 | 86 | 82 |
| | After heating 400 nm [%] | 89 | 90 | 88 | 80 |
| | 350 nm [%] | 87 | 89 | 85 | 47 |
| Young's modulus | 23° C. [MPa] | 70 | 68 | 110 | 180 |
| | 150° C. [MPa] | 33 | 31 | 70 | 25 |
| Measured value at 150° C./measured value at 23° C. | | 0.54 | 0.46 | 0.64 | 0.14 |

*The number of the hydrogen atoms bonded to silicon atom present in the crosslinking agent, relative to one vinyl group present in the base polymer.

The composition in Comparative Example 1 used polyorganosiloxane containing a phenyl group, and the cured product obtained from this composition had poor light transmission properties at 350 nm. Further, in the cured product obtained after the heating test, the light transmittances both at 400 nm and 350 nm were lowered due to yellowing, and especially the light transmittance at 350 nm was remarkably lowered. With respect to the Young's modulus, the ratio of a measured value at 150° C. to a measured value at 23° C. was ⅓ or less.

In contrast, with respect to each of the compositions in Examples 1 to 3 of the present invention, the cured product obtained from each composition had excellent light transmittances both at 400 nm and 350 nm. Further, in the cured product obtained after the heating test, the lowering of the light transmittance was suppressed. The fact that the lowering of the transmittance at 400 nm was suppressed indicates that the occurrence of yellowing was prevented. With respect to the Young's modulus, the ratio of a measured value at 150° C. to a measured value at 23° C. was ⅓ or more.

INDUSTRIAL APPLICABILITY

The curable polyorganosiloxane composition of the present invention can provide a cured product having excellent light transmission properties in a short wavelength region, i.e., in the blue to ultraviolet region and having excellent heat resistance, and hence is advantageously used for various optical lenses. Further, the present invention is advantageously used in sealing or protection of LED, lens, and others.

The invention claimed is:

1. A curable polyorganosiloxane composition comprising:
   a component (A) which is an alkenyl group-containing polyorganosiloxane which comprises:
      a component (A1) which is a branched polyorganosiloxane comprising an $SiO_{4/2}$ unit and an $R_3SiO_{1/2}$ unit with a molar ratio of the $R_3SiO_{1/2}$ unit to the $SiO_{4/2}$ unit in the range of 1:0.8 to 1:3, and optionally an $R_2SiO$ unit and/or an $RSiO_{3/2}$ unit, wherein at least three R per molecule are alkenyl groups, and 100 mol % of R, excluding the alkenyl groups, are methyl groups and optionally
      a component (A2) which is a linear polyorganosiloxane having R bonded to a silicon atom, wherein at least two R per molecule are alkenyl groups, and 100 mol % of the R, excluding the alkenyl groups, are methyl groups;
   a component (B) which is a polyalkylhydrogensiloxane comprising an $SiO_{4/2}$ unit and an $R^3(CH_3)_2SiO_{1/2}$ unit with a molar ratio of the $R^3(CH_3)_2SiO_{1/2}$ unit to the $SiO_{4/2}$ unit is in the range of 1.5:1 to 2.2:1, the polyalkylhydrogensiloxane being represented by the formula $[R^3(CH_3)_2SiO_{1/2}]_8[SiO_{4/2}]_4$ or the formula $[R^3(CH_3)_2SiO_{1/2}]_{10}[SiO_{4/2}]_5$, wherein each $R^3$ represents a hydrogen atom; and
   a component (C) which is a platinum-vinylsiloxane complex having a platinum group metal atom,
   wherein the component (B) is contained in an amount such that the number of the $R^3$ as a hydrogen atom is 0.5 to 2.0, relative to one alkenyl group present in the component (A),
   wherein the component (C) is contained in an amount of 0.1 to 1,000 ppm by weight in terms of the platinum group metal atom, relative to the weight of the component (A),
   wherein the amount of the component (A1) is 50 to 100% by weight and the amount of the component (A2) is 50 to 0% by weight, relative to 100% by weight of the component (A), and
   wherein the R as an alkenyl group is a vinyl group.

2. A cured product obtained by curing the polyorganosiloxane composition according to claim 1.

3. The cured product according to claim 2, which is a sealing material for a light emitting diode.

4. The polyorganosiloxane composition according to claim 1, further comprising an inorganic filler.

5. The polyorganosiloxane composition according to claim 1, further comprising a curing retarder.

* * * * *